UNITED STATES PATENT OFFICE.

OSCAR NASTVOGEL, OF ELBERFELD, GERMANY, ASSIGNOR TO THE FARBENFABRIKEN OF ELBERFELD CO., OF NEW YORK, N. Y.

YELLOW ACRIDIN DYE AND PROCESS OF MAKING SAME.

SPECIFICATION forming part of Letters Patent No. 675,568, dated June 4, 1901.

Application filed September 25, 1900. Serial No. 31,088. (Specimens.)

*To all whom it may concern:*

Be it known that I, OSCAR NASTVOGEL, doctor of philosophy, chemist, (assignor to the FARBENFABRIKEN OF ELBERFELD COMPANY, of New York,) residing at Elberfeld, Germany, have invented a new and useful Improvement in Yellow Dye and Process of Making Same; and I hereby declare the following to be a clear and exact description of my invention.

I have found that the hitherto unknown unsymmetrically-alkylated diamidoacridins having the following general formula

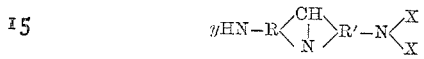

(R and R′ meaning in this formula either the same or two different alphyl radicals such as phenyl, tolyl, or the like, X meaning an alkyl radical, such as methyl, ethyl, or the like, and $y$ meaning a hydrogen atom, which can be substituted by an alkyl radical, such as methyl, ethyl, or the like) represent valuable yellow dyestuffs.

For the preparation of these new coloring-matters certain unsymmetrically dialkylated or trialkylated derivatives of tetraämidodiphenylmethane or its homologues are employed as bases or starting materials. The bases can be obtained by nitrating the unsymmetrically dialkylated or trialkylated dialphylmethanes (see German Letters Patent No. 107,718) and reducing the corresponding dinitro compounds. The said unsymmetrically-alkylated tetraämidodialphylmethane bases are in a pure state colorless well-crystallizing compounds, but slightly soluble in water. They are soluble in hot toluene, chloroform, and alcohol and also soluble in dilute mineral acids. By recrystallization from the said organic solvents they can be obtained in the shape of well-formed crystals. The salts of the said unsymmetrically-alkylated tetraämidodialphylmethane bases are transformed into acridin derivatives on boiling the same with water either in open vessels or in autoclaves under pressure. In order to accelerate and to complete the reaction, it is advantageous to add to the reaction mixture such agents as are capable of splitting off ammonia—as, for instance, mineral acids, zinc chlorid, or the like. The oxidation of the resulting acridin leuco bases to form the corresponding coloring-matters begins as soon as they are exposed to the action of the oxygen contained in the air; but in order to effect the same more rapidly it is advantageous to employ one of the usual oxidizing agents, such as ferric chlorid or the like. The new dyestuffs thus obtained are when dry and pulverized from red to brown powders, being soluble in water and in alcohol with an orange-yellow color. The solution of these dyestuffs in alcohol and in water shows a beautiful yellowish-green fluorescence. They dye leather yellow even shades, which turn somewhat redder by the action of mineral acids In carrying out my new process practically I can proceed as follows, the parts being by weight: Twenty-four parts of carefully-dried dimethyldiamido-phenyl-tolylmethane having the formula

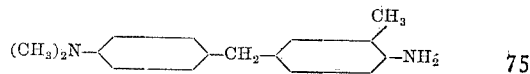

are dissolved in two hundred parts of sulfuric acid, (of 66° Baumé.) Into the resulting solution a mixture prepared from 21.5 parts of nitric acid (of 40° Baumé) and fifty parts of sulfuric monohydrate is slowly stirred, care being taken that the temperature does not surpass 5° centigrade. Subsequently the reaction mixture is poured on ice and the acid is partially neutralized by the addition of sodium carbonate. By means of this operation the resulting dinitrated compound having the formula

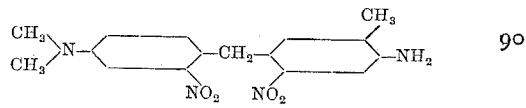

is separated as a brick-red crystalline mass. By a recrystallization from acetone it is obtained in the shape of red needles melting at from 159° to 160° centigrade. The transformation of the said dinitro compound into the corresponding amido compound having the formula

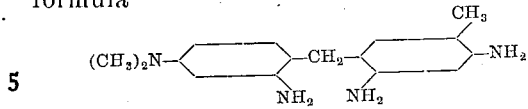

can be carried out as follows: One part of the dinitro compound dissolved in five parts of a 36.5 per cent. hydrochloric acid is reduced in the usual manner by means of 1.5 parts of zinc-dust, while carefully cooling by the addition of ice. After the reaction has been finished the zinc-dust is removed by filtration. The tetraämido compound thus produced is precipitated from the filtrate by the addition of an excess of soda-lye. The resulting product can be purified by a recrystallization from chloroform. It is thus obtained in the shape of colorless needles melting at 177° centigrade. For transforming the intermediate product thus obtained into the corresponding dyestuff I proceed as follows: In a closed vessel lined with lead a solution prepared from one part of dimethyltetraämidophenyltolylmethane having the above given formula and twenty parts of a twenty-per-cent. sulfuric acid is heated for seven hours at about from 120° to 130° centigrade. After having been allowed to cool the resulting solution is mixed with about three parts of calcined sodium carbonate in order to neutralize partially the acid contained therein, and then common salt-zinc chlorid and such a quantity of ferric chlorid is added until in a test portion an increase of the dyestuff is no longer to be observed by the further addition of ferric chlorid. By means of this operation the dyestuff thus produced is precipitated in the shape of a reddish-brown resinous mass which soon solidifies to a red crystalline substance which is soluble in water and in alcohol with an orange-yellow color, the watery solution having a yellowish-green fluorescence which very much increases by the addition of alcohol. It is soluble in concentrated hydrochloric acid with a yellowish-brown color and is dissolved by concentrated sulfuric acid (of 66° Baumé) with a slight yellowish-brown color, which turns redder and is changed into orange red on the addition of a small quantity of ice, while it is changed into orange yellow on adding a larger quantity of ice to the sulfuric-acid solution. It dyes leather even yellow shades.

Very similar results are obtained if instead of the starting material used in the above example other of the above-mentioned products are used.

Having now described my invention and in what manner the same is to be performed, what I claim as new, and desire to secure by Letters Patent, is—

1. The process for producing new dyestuffs of the acridin series, which process consists in first heating with dilute mineral acids the unsymmetrically-alkylated derivatives of tetraämidodialphylmethane having the general formula:

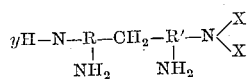

hereinbefore described, secondly oxidizing the leuco compounds thus obtained and finally isolating the resulting dyestuffs, substantially as hereinbefore described.

2. The process for producing a new dyestuff of the acridin series, which process consists in first heating dimethyltetraämidophenyltolylmethane of the formula

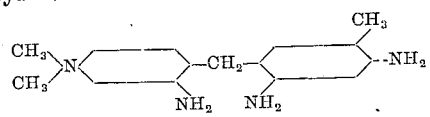

with dilute sulfuric acid, secondly oxidizing the leuco compound thus obtained and finally isolating the resulting dyestuff, substantially as hereinbefore described.

3. The herein-described new dyestuffs of the acridin series being, when dry and pulverized, from red to brown powders soluble in water and in alcohol with an orange-yellow color which solutions show a beautiful yellowish-green fluorescence, dyeing leather yellow even shades which turn somewhat redder by the action of mineral acids, substantially as hereinbefore described.

4. The herein-described new dyestuff of the acridin series which contains as base the acridin derivative having the following formula:

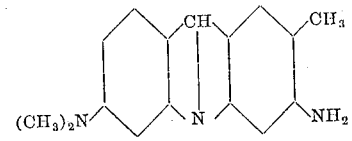

being, when dry and pulverized, a reddish-brown powder soluble in water and in alcohol with an orange-yellow color, the watery solution showing a yellowish-green fluorescence which very much increases by the addition of alcohol, soluble in concentrated hydrochloric acid with a yellowish-brown color, being dissolved by concentrated sulfuric acid of 66° Baumé with a slight yellowish-brown color which is changed into orange red on the addition of a small quantity of ice, while it is changed into orange yellow on adding a larger quantity of ice to the sulfuric-acid solution, dyeing leather yellow even shades, substantially as hereinbefore described.

In testimony whereof I have signed my name in the presence of two subscribing witnesses.

OSCAR NASTVOGEL.

Witnesses:
OTTO KÖNIG,
T. A. RITTERSHAUS.